United States Patent
Avraham et al.

(10) Patent No.: US 11,947,830 B2
(45) Date of Patent: Apr. 2, 2024

(54) KEY VALUE DATA PLACEMENT ACCORDING TO EXPECTED READS

(71) Applicant: Western Digital Technologies, Inc., San Jose, CA (US)

(72) Inventors: David Avraham, Even Yehuda (IL); Alexander Bazarsky, Holon (IL); Ran Zamir, Ramat Gan (IL)

(73) Assignee: Western Digital Technologies, Inc., San Jose, CA (US)

( * ) Notice: Subject to any disclaimer, the term of this patent is extended or adjusted under 35 U.S.C. 154(b) by 36 days.

(21) Appl. No.: 17/747,076

(22) Filed: May 18, 2022

(65) Prior Publication Data
US 2023/0376232 A1 Nov. 23, 2023

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
CPC ..... G06F 3/0655; G06F 3/0604; G06F 3/0679
See application file for complete search history.

(56) References Cited

U.S. PATENT DOCUMENTS

| | | | | |
|---|---|---|---|---|
| 2011/0276744 A1* | 11/2011 | Sengupta | ............. | G11C 7/1072 711/216 |
| 2013/0151756 A1* | 6/2013 | Tofano | ................... | G06F 3/0679 711/E12.008 |
| 2016/0124841 A1* | 5/2016 | Nito | ........................ | G06F 3/0659 711/102 |
| 2016/0196207 A1* | 7/2016 | Gupta | .................... | G06F 3/0652 711/103 |
| 2018/0285440 A1* | 10/2018 | Gupta | ................. | G06F 16/2471 |

OTHER PUBLICATIONS

Kim, et al., The Key to Value: Understanding the NVMe Key-Value Standard, Live Website, Sep. 1, 2020, SNIA NSF, Networking Storage, 31 pp.
Adams, NVMe® Base Specification 2.0 Preview, Flash Memory Summit, 2020, NVM Express organization, 20 pp.
Samsung Key Value SSD Enables High Performance Scaling, A Technology Brief by Samsung Memory Solutions Lab, Samsung Electronics, Co. Ltd., 2017, 8 pp.
Martin, et al, NVM Express Technical Proposal for New Feature, Jun. 2020, NVM Express, Inc., 34 pp.

* cited by examiner

*Primary Examiner* — Edward J Dudek, Jr.
(74) *Attorney, Agent, or Firm* — PATTERSON + SHERIDAN, LLP

(57) ABSTRACT

A data storage device includes a memory device and a controller coupled to the memory device. The controller is configured to receive key value (KV) pair data, group a plurality of KV pair data based on a data clustering value, aggregate the grouped plurality of KV pair data, and program the aggregated plurality of KV pair data to the memory device. A length of the KV pair data is less than a size of a flash management unit (FMU). The KV pair data includes a key and a value. Each KV pair data of the plurality of KV pair data has a length less than the size of the FMU. The received KV pair data is stored in a temporary location and grouped together in the temporary location. The grouping is based on a similarity of characteristics of plurality of KV pair data.

18 Claims, 5 Drawing Sheets

KEY VALUE DATA PLACEMENT ACCORDING TO EXPECTED READS

BACKGROUND OF THE DISCLOSURE

Field of the Disclosure

Embodiments of the present disclosure generally relate to data storage devices, such as solid state drives (SSDs), and, more specifically, optimized aggregation of key value (KV) pair data having less than a flash management unit (FMU) size.

Description of the Related Art

A KV database works by storing a quantity of user data that is associated with a key that is addressable as a complete entity. Examples of user data that can be stored in a KV database may include photos, records, and files. From a host device point-of-view, the photo, the record, or the file may be retrieved using a single key/address, rather than using multiple addresses that include data of the photo, the record, or the file. The data is stored as unstructured data and may be addressed using a key of variable length. Storage space of a memory device may be allocated for KV pair data in increments of bytes, where a length value of the KV pair data is associated with the necessary storage space to store the KV pair data.

Using a KV database in a data storage device may increase the performance of the data storage device. For example, the number of data transfers/second may be improved because the KV pair data to physical storage location translation layer in the host device may be removed. Furthermore, the number of commands over the bus may be reduced since an entire KV pair data may utilize a single transfer. KV pair data allows access to data on a controller using a key rather than a block address. However, when KV pair data is less than a flash management unit (FMU) size, the KV pair data may be unaligned with boundaries of the physical memory, which may impact the performance of the data storage device due to unaligned reads or requiring additional reads to read the KV pair data.

Therefore, there is a need in the art to optimize KV pair data placement when the KV pair data is less than a FMU size in order to optimize read performance.

SUMMARY OF THE DISCLOSURE

The present disclosure generally relates to data storage devices, such as solid state drives (SSDs), and, more specifically, optimized aggregation of key value (KV) pair data having less than a flash management unit (FMU) size. A data storage device includes a memory device and a controller coupled to the memory device. The controller is configured to receive KV pair data, group a plurality of KV pair data based on a data clustering value, aggregate the grouped plurality of KV pair data, and program the aggregated plurality of KV pair data to the memory device. A length of the KV pair data is less than a size of a FMU. The KV pair data includes a key and a value. Each KV pair data of the plurality of KV pair data has a length less than the size of the FMU. The received KV pair data is stored in a temporary location and grouped together in the temporary location. The grouping is based on a similarity of characteristics of plurality of KV pair data.

In one embodiment, a data storage device includes a memory device and a controller coupled to the memory device. The controller is configured to receive key value (KV) pair data, where a length of the KV pair data is less than a size of a flash management unit (FMU), and where the KV pair data comprises a key and a value, group a plurality of KV pair data based on a data clustering value, wherein each KV pair data of the plurality of KV pair data has a length less than the size of the FMU, aggregate the grouped plurality of KV pair data, and program the aggregated plurality of KV pair data to the memory device.

In another embodiment, a data storage device includes a memory device and a controller coupled to the memory device. The controller is configured to receive key value (KV) pair data, wherein KV pair data comprises a key and a value, determine characteristics of the received KV pair data, determine a temporary storage location to store the received KV pair data, where the data storage device comprises two or more temporary storage locations, and where the determining is based on the determined characteristics of the received KV pair data, assign the value of the KV pair data to an open flash management unit (FMU), where the open FMU is associated with the temporary storage location, and encode and program the data of the open FMU to a selected location of the memory device after the open FMU is filled to writable capacity.

In another embodiment, a data storage device includes memory means and a controller coupled to the memory means. The controller is configured to aggregate key value (KV) pair data having a length less than a flash management unit (FMU) size in a storage location, where the aggregating is based on a relationship between a first KV pair data and a second KV pair data, and program the aggregated KV pair data to the memory means when the aggregated KV pair data is equal to or greater than the FMU size.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, optimized aggregation or key value (KV) pair data having less than a flash management unit (FMU) size. A data storage device includes a memory device and a controller coupled to the memory device. The controller is configured to receive KV pair data, group a plurality of KV pair data based on a data clustering value, aggregate the grouped plurality of KV pair data, and program the aggregated plurality of KV pair data to the memory device. A length of the KV pair data is less than a size of a FMU. The KV pair data includes a key and a value. Each KV pair data of the plurality of KV pair data has a length less than the size of the FMU. The received KV pair data is stored in a temporary location and grouped together in the temporary location. The grouping is based on a similarity of characteristics of plurality of KV pair data.

Figure 1:
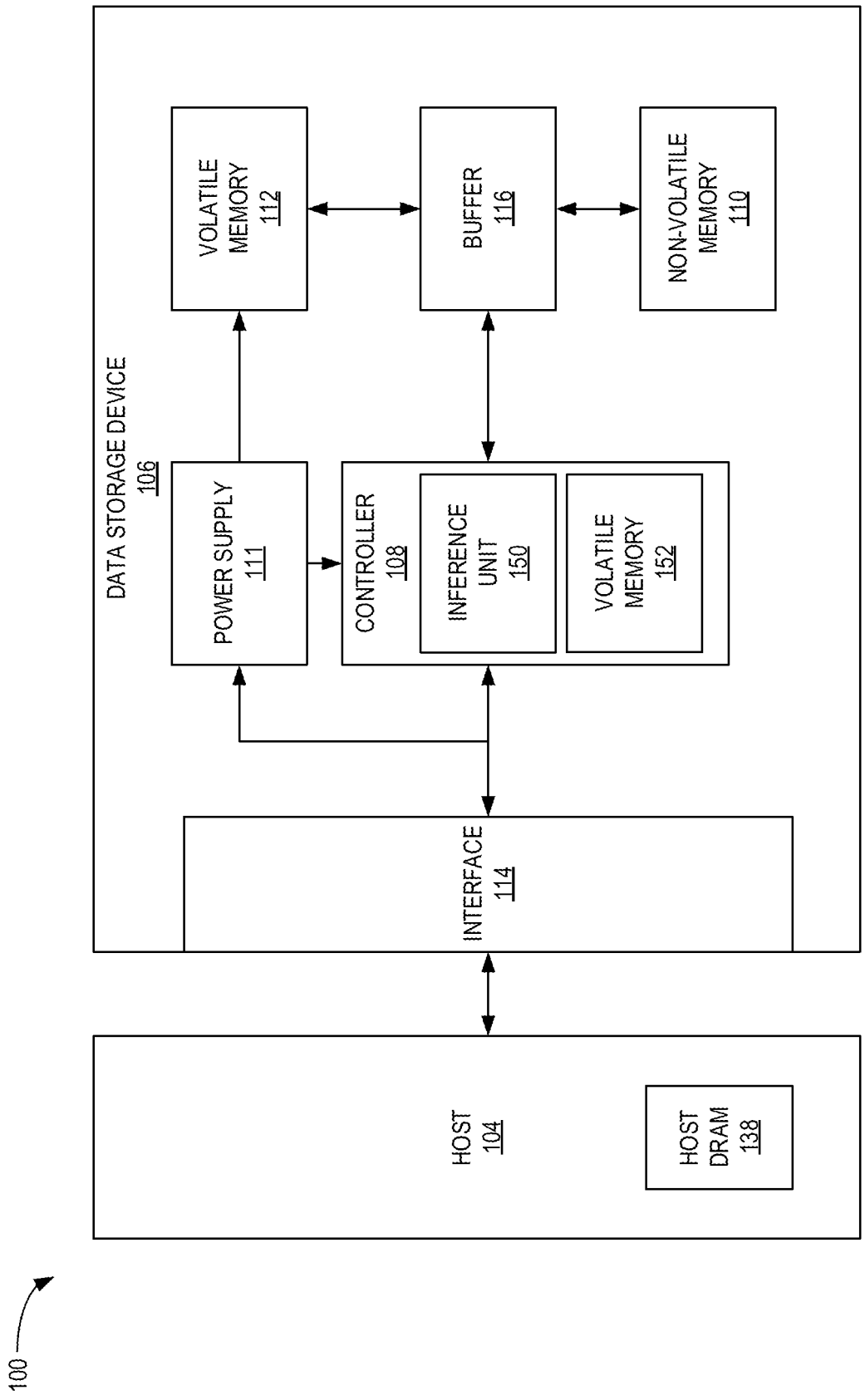
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory, such as a second volatile memory 152, or write buffer 116 before sending the data to the NVM 110.

The controller 108 includes an inference unit 150 and the second volatile memory 152. The second volatile memory 152 may be SRAM. The controller 108 may utilize the second volatile memory 152 as a temporary holding location within the controller 108. Because data may be programmed to the NVM 110 sequentially, or, more specifically, wordline by wordline, the controller 108 may use the second volatile memory 152 as a cache to store data that is less than a FMU size or a minimum write size and aggregate data that is less than a FMU size or a minimum write size into at least the FMU size or the minimum write size.

The inference unit 150 may be configured to determine similarities between one or more KV pair data that is received from the host device 104 in less than a FMU or minimum write size. Thus, the inference unit 150 may infer which KV data pairs are likely to be read together and may cause the controller 108 to group or cluster the inferred KV data pairs to be stored together. For example, the similarities may be based on characteristics of the KV pair data. Therefore, the inference unit 150 may be configured to determine the characteristics of received KV pair data from the host device 104. For example, the characteristics may be based on a length of the received KV pair data, a key index of the received KV pair data, an internal pattern of the received KV pair data, a metadata of the received KV pair data, a hint of the received KV pair data, a time of receiving the received KV pair data (which may include an adjustment factor to account for a difference between a time of receiving subsequent KV pair data), an expected read time of the received KV pair data, combinations of the aforementioned characteristics, and the like. Based on the characteristics of the one or more received KV pair data, the inference unit 150 may aggregate the one or more KV pair data that has similar characteristics so that the aggregated KV pair data is at least equal or greater than the FMU size.

Furthermore, the inference unit 150 may generate, maintain, and update a table, which may be stored in the second volatile memory 152, that has a data clustering matrix comparing each KV pair data that has a size less than a FMU or minimum write size to another KV pair data that has a size less than the FMU or minimum write size. In some examples, the table may be a model showing a relationship between KV pair data stored in the second volatile memory 152 (or in some examples, in SLC memory). The inference unit 150, or the controller 108, may include logic to group a plurality of KV pair data, each having a size less than a FMU or minimum write size, based on the data clustering value of each of the plurality of KV pair data. The data clustering value for each KV pair data having a size less than the FMU or minimum write size may be a value between 0 and 1, where a data clustering value closer to 1 indicates that the compared KV pair data having a size less than the FMU or minimum write size is relatively similar based on the characteristics of each of the KV pair data compared, and where a data clustering value closer to 0 indicates that the compared KV pair data having a size less than the FMU or minimum write size are not relatively similar based on the characteristics of each of the KV pair data compared. In other words, a data clustering value greater than or equal to about 0.5 indicates that the compared KV pair data are relatively similar, where data clustering values closer to 1 indicates that the compared KV pair data are more similar than KV pair data having data clustering values closer to 0.5, and a data clustering value less than about 0.5 indicates that the compared KV pair data are relatively different, where data clustering values closer to 0 indicates that the compared KV pair data are increasingly different than KV pair data having data clustering values closer to 0.5. Thus, when one or more characteristics of a first KV pair data and a second KV pair data are within a predetermined threshold difference, then a corresponding data clustering value may be increased. Conversely, when one or more characteristics of a first KV pair data and a second KV pair data are outside a predetermined threshold difference, then a corresponding data clustering value may be decreased.

An example of the data clustering values for a plurality of KV pair data having a size less than a FMU or minimum write size is shown in Table 1 below.

TABLE 1

|  | KV Pair Data #1 | KV Pair Data #2 | KV Pair Data #3 |
| --- | --- | --- | --- |
| KV Pair Data #1 | X | 0.6 | 0.7 |
| KV Pair Data #2 | 0.6 | X | 0.3 |
| KV Pair Data #3 | 0.7 | 0.3 | X |

Based on Table 1, KV pair data #1 may be grouped with KV pair data #2 and KV pair data #3. In some cases, the grouping may occur such that the aggregated KV pair data is substantially equal to at least a FMU size or a minimum write size. In those cases, if the aggregated size of KV pair data #1 and the size of either KV pair data #2 or KV pair data #3 is at least equal to the FMU size or the minimum write size, then the inference unit 150, or the controller 108, may group either KV pair data #1 with KV pair data #2 or KV pair data #1 with KV pair data #3. Because KV pair data #3 has a greater data clustering value (or is closer to 1) than the data clustering value of KV pair data #2 when paired with KV pair data #1, the inference unit 150, or the controller 108, may choose to aggregate KV pair data #1 with KV pair data #3 and keep KV pair data #2 stored in the second volatile memory 152 to be aggregated with another KV pair data. It is to be understood that other data clustering schemes and tracking methods may be utilized and applicable to the embodiments described herein.

Figure 2B:
FIG. 2B is a table illustrating a command set for a KV database, according to certain embodiments.
Figure 2A:
FIG. 2A is an exemplary illustration of a KV pair data, according to certain embodiments.

FIG. 2A is an exemplary illustration of a KV pair data 200, according to certain embodiments. KV pair data 200 includes a key 202 and a value 204, where the data, which may be host data, of the value 204 is addressed by the key 202. The key 202 may have a size of about 1 byte to about 64 bytes and the value 204 may have a size of about 0 bytes to about 232-1 bytes. For example, when the value 204 has a size of about 0 bytes, the value 204 is an empty value. It is to be understood that the previously mentioned values are not intended to be limiting, but to provide an example of an embodiment. Because the value 204 may have a size greater than a physical wordline (e.g., greater than 16 KB), the value 204 may be divided across several wordlines and may result in misalignment. Misalignment may occur when data from multiple values are stored in a single wordline or when a portion of the value 204 is stored partially on a single wordline. Because misalignment of stored data may result in multiple reads, quality of service of a data storage device storing the misaligned data may be decreased and a power consumption of the data storage device may be increased.

FIG. 2B is a table 250 illustrating a command set for a KV database, according to certain embodiments. For exemplary purposes, aspects of the storage system 100 of FIG. 1 may be referenced herein. A KV system may include a command set that includes, in a non-limiting list, a delete command, a list command, a retrieve command, an exist command, and a store command. The delete command may cause the controller 108 to delete the key 202 and value 204 associated with the key 202. The list command may cause the controller 108 to list keys that exist in a KV namespace starting at a specified key. The exist command may cause the controller 108 to return a status indicating whether a KV pair data 200 exists for a specified key to the command generator, such as the host device 104. The store command may cause the controller 108 to store a KV pair data to a KV namespace.

The retrieve command may cause the controller 108 to retrieve the value 204 associated with a specified key from a KV namespace. The length to be retrieved of the KV pair data 200 is specified in the retrieve command and the location to transfer the KV pair data 200 is specified by either a scatter gather list (SGL) pointer or a physical region page (PRP) pointer in the retrieve command. If the specified length in the retrieve command is less than the length of the KV pair data 200 that is being retrieved, then the controller 108 returns the requested amount and the length of the KV pair data 200 to the completion queue. However, if the specified length in the retrieve command is greater than the length of the KV pair data 200 that is being retrieved, then the controller 108 returns the data from the NVM 110 and the length of the KV pair data 200 is returned to the completion queue.

Figure 3:
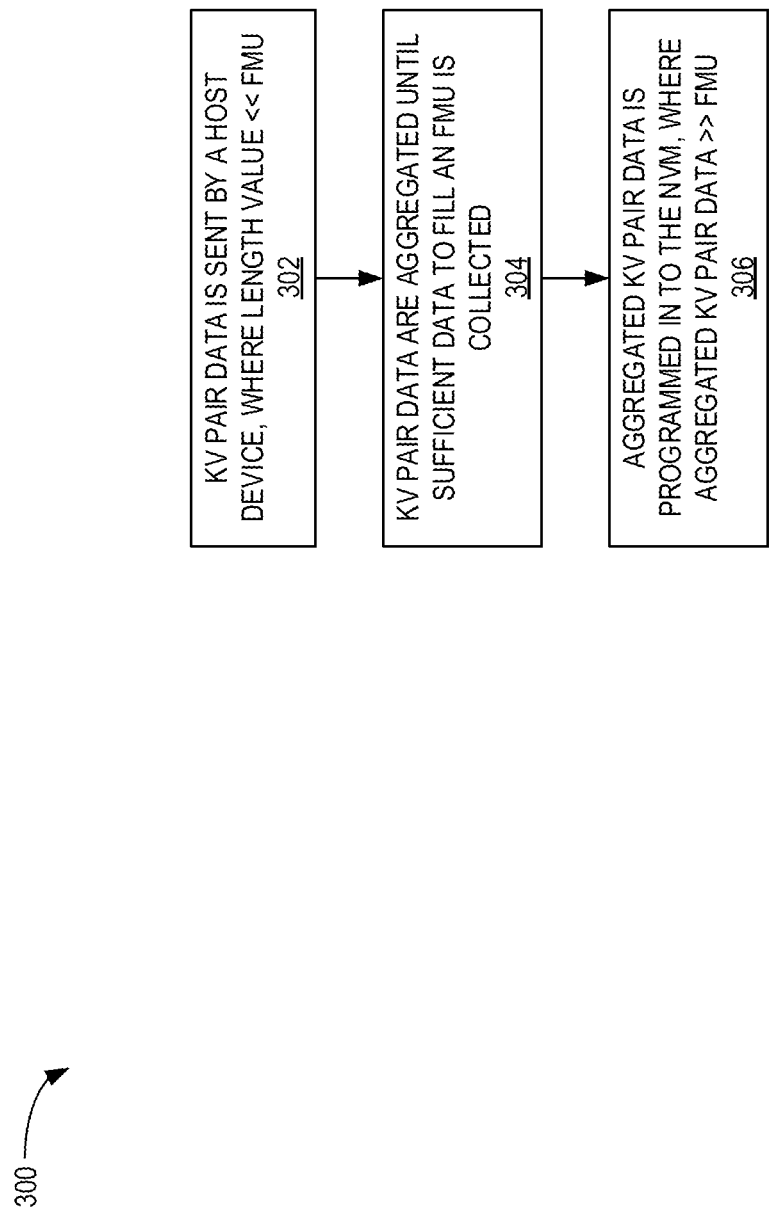
FIG. 3 is a flow diagram illustrating a method of programming KV pair data to a memory device, according to certain embodiments.

FIG. 3 is a flow diagram illustrating a conventional method 300 of programming KV pair data to a memory device, according to certain embodiments. For exemplary purposes, aspects of the storage system 100 of FIG. 1 may be referenced herein. For example, references to a host device may refer to the host device 104 and a controller may refer to the controller 108.

At block 302, KV pair data is sent by a host device 104 to the data storage device 106, where the controller 108 receives the KV pair data. In some examples, the controller 108 may fetch the KV pair data from a submission queue of the host device 104. In other examples, the host device 104 may push the KV pair data to the data storage device. The received KV pair data has a length value that is less than a size of a FMU or a minimum write size. The terms "FMU" and "minimum write size" may be referred to interchangeably herein for simplification purposes.

At block 304, the KV pair data that have a size less than the FMU size are aggregated in volatile memory, which may be the volatile memory 112 or the second volatile memory 152, to a size equal to at least the FMU size. The aggregation may be completed in an opportunistic manner, a received order, and/or in a manner resembling executing random write. At block 306, the aggregated KV pair data is programmed to the NVM 110, where the aggregated KV pair data has a size equal to or greater than the FMU size. The aggregated KV pair data is encoded prior to the programming.

Figure 4:
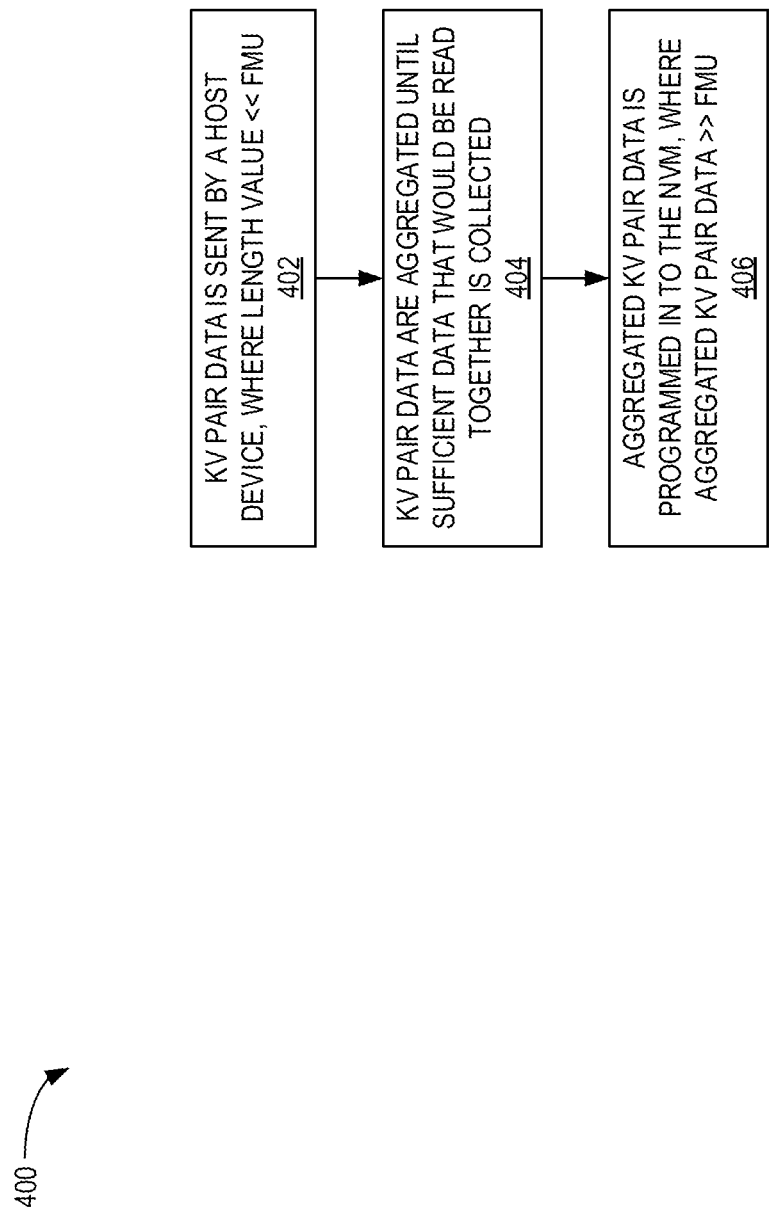
FIG. 4 is a flow diagram illustrating a method of programming KV pair data based on a determined characteristics of aggregated KV pair data, according to certain embodiments.

FIG. 4 is a flow diagram illustrating a method 400 of programming KV pair data based on a determined characteristics of aggregated KV pair data, according to certain embodiments. For exemplary purposes, aspects of the storage system 100 of FIG. 1 may be referenced herein. For example, references to a host device may refer to the host device 104 and a controller may refer to the controller 108.

At block 402, KV pair data is sent by a host device 104 to the data storage device 106, where the controller 108 receives the KV pair data. In some examples, the controller 108 may fetch the KV pair data from a submission queue of the host device 104. In other examples, the host device 104 may push the KV pair data to the data storage device. The received KV pair data has a length value that is less than a size of a FMU or a minimum write size. The terms "FMU" and "minimum write size" may be referred to interchangeably herein for simplification purposes.

At block 404, the KV pair data that have a size less than the FMU size are aggregated in volatile memory, which may be the volatile memory 112 or the second volatile memory 152, to a size equal to at least the FMU size. In some examples, the KV pair data may be stored in SLC memory or hybrid memory blocks. The aggregation may be completed based on characteristics that would indicate that KV pair data aggregated would be read together (e.g., sensed, transferred, and decoded together) on the same codeword or different codeword of the same wordline. For example, the characteristics may be the characteristics/similarities listed in FIG. 1. It is to be understood that other attributes or characteristics may be added as tiers. For example, writing data in different dies in order to allow transfer/reading in parallel may be added as an additional tier. Furthermore, the controller 108 or the inference unit 150 may determine which KV pair data to aggregate based on the data clustering value.

Likewise, the clustering or grouping of KV pair data may be periodic, such as after a period time has elapsed, a number of KV pair data has been received, and the like, or in response to a data management operation, such as garbage collection. Likewise, the logic or the algorithm (e.g., model) to cluster or group the KV pair data may be trained periodically based on data collected during the lifetime of the data storage device 106, a moving average time, weights used in previous logic or algorithms to cluster or group the KV pair data, hyper-parameters of the previous logic or algorithms, the like, and combinations thereof. At block 406, the aggregated KV pair data is programmed to the NVM 110, where the aggregated KV pair data has a size equal to or greater than the FMU size. The aggregated KV pair data is encoded prior to the programming. In examples, where the KV pair data to be aggregated is stored in SLC memory or hybrid memory blocks, the controller 108 may fold the data into TLC memory blocks or QLC memory blocks. Likewise, the controller 108 may program the aggregated KV pair data (i.e., the grouped or clustered KV pair data) to either a same wordline, a meta-wordline, a meta-page, a meta-page, and the like. The term "meta" may indicate a relative "container" to place data into, such that the containers are spread across multiple dies, where data stored in the same relative "container" are read from and written to together in order increase parallelism. In other words, the controller 108 may select a certain "container" to program the aggregated KV pair data to in order to increase parallelism of reads and writes based on a likelihood that the data will be read together. Furthermore, the "containers" may be derived based on a clustering or a clustering of clusters.

Figure 5:
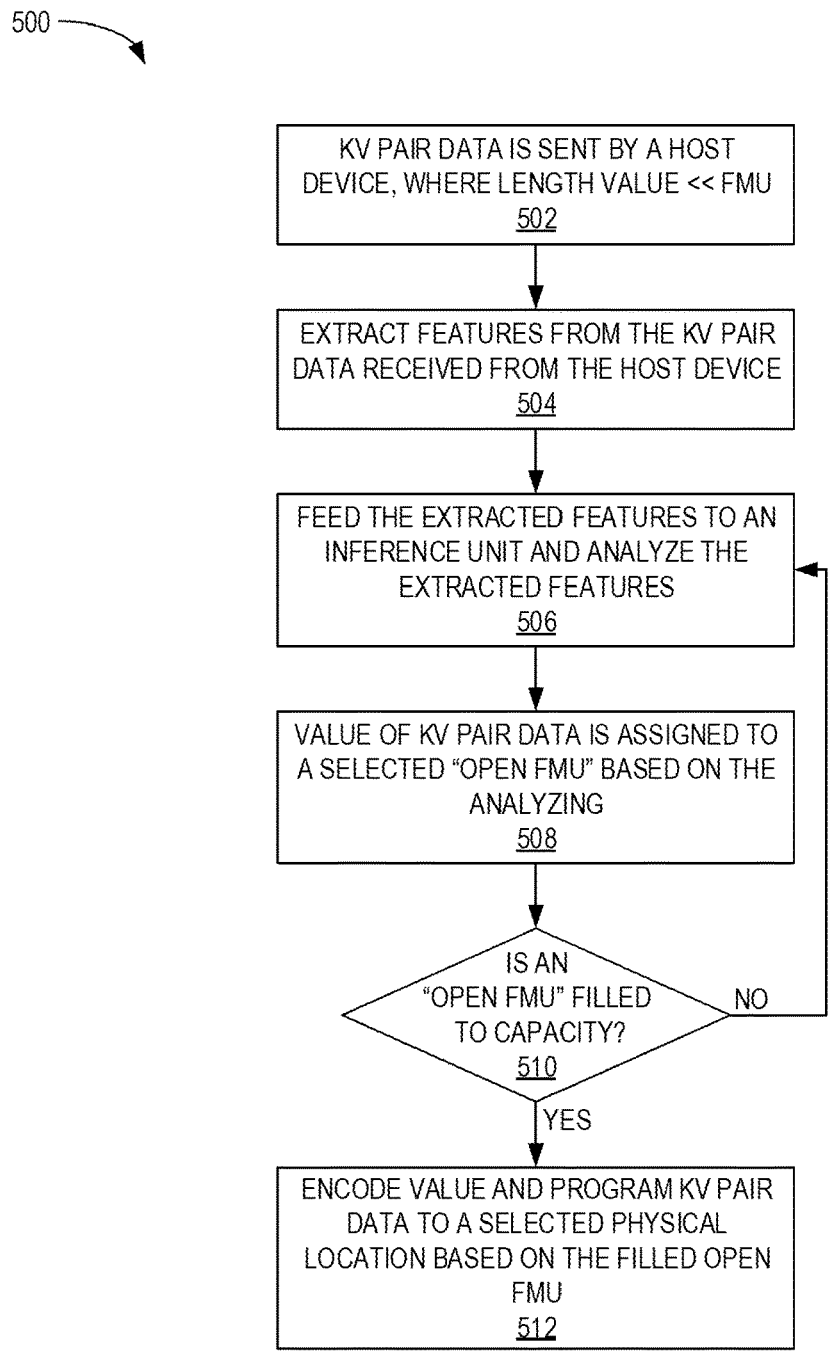
FIG. 5 is a flow diagram illustrating a method of programming KV pair data to a memory device, according to certain embodiments.

FIG. 5 is a flow diagram illustrating a method 500 of programming KV pair data to a memory device, according to certain embodiments. For exemplary purposes, aspects of the storage system 100 of FIG. 1 may be referenced herein. For example, references to a host device may refer to the host device 104 and a controller may refer to the controller 108.

At block 502, KV pair data is sent by a host device 104 to the data storage device 106, where the controller 108 receives the KV pair data. In some examples, the controller 108 may fetch the KV pair data from a submission queue of the host device 104. In other examples, the host device 104 may push the KV pair data to the data storage device. The received KV pair data has a length value that is less than a size of a FMU or a minimum write size. The terms "FMU" and "minimum write size" may be referred to interchangeably herein for simplification purposes.

At block 504, the controller 108 or the inference unit 150 extracts features from the received KV pair data. The extracted features may be a hint, such as a stream number (e.g., stream 0-9), a group number (e.g., group 0-9), a label, and the like. For example, a label may indicate that a data cluster is relevant to a leaf number in a host tree (such as a merkle tree) and its neighbors. It is to be understood that other extracted features and hints not listed are contemplated and may be applicable to the described embodiments. At block 506, the extracted features are provided to the inference unit 150 and the inference unit analyzes the extracted features. At block 508, the value of the KV pair data is assigned to a selected "open FMU" based on the analyzing. The open FMU may be one that has similar KV pair data based on the analyzing. At block 510, the controller 108 determines if the "open FMU" is filled to a minimum writing capacity (e.g., FMU size or minimum write size). If the "open FMU" is not filled to the minimum writing capacity at block 510, then method 500 returns to block 506. However, if the "open FMU" is filled to the minimum writing capacity at block 510, then the aggregated values of the "open FMU" are encoded and programmed to the selected physical location associated with the "open FMU" at block 512.

By aggregating a plurality of KV pair data, each having value length less than a FMU size, based on a similarity of characteristics of the KV pair data, faster read time with lower latency may be achieved, thus improving read performance.

In one embodiment, a data storage device includes a memory device and a controller coupled to the memory device. The controller is configured to receive key value (KV) pair data, where a length of the KV pair data is less than a size of a flash management unit (FMU), and where the KV pair data comprises a key and a value, group a plurality of KV pair data based on a data clustering value, wherein each KV pair data of the plurality of KV pair data has a length less than the size of the FMU, aggregate the grouped plurality of KV pair data, and program the aggregated plurality of KV pair data to the memory device.

The data clustering value is based on at least one of a length of each KV pair data, a key index of each KV pair data, a time difference of each KV pair data, metadata of each KV pair data, and internal patterns of a value of each KV pair data. The data clustering value for a first KV pair data is increased when a time difference between the first KV pair data and a second KV pair data is less than or equal to a predetermined time threshold. The data clustering value for the first KV pair data is decreased when the time difference between the first KV pair data and the second KV pair data is greater than the predetermined time threshold. The data clustering value for a first KV pair data is increased when a first length of the first KV pair data and a second length of a second KV pair data is within a predetermined length threshold. The data clustering value for a first KV pair data is increased when a first key index of the first KV pair data and a second key index of a second KV pair data are the same. The data clustering value for a first KV pair data is increased when a second metadata of a second KV pair data is within a predetermined threshold difference of a first metadata of the first KV pair data. The data clustering value for a first KV pair data is increased when at least a portion of an internal pattern of the first KV pair data and at least a portion of an internal pattern of a second KV pair data are the same. The controller is further configured to receive a first read command for a first KV pair data, determine first characteristics of the first KV pair data, generate a model based on the determined first characteristics of the first KV pair data, receive a second read command for a second KV pair data, determine second characteristics of the second KV pair data, and update the model based on the determined second characteristics. The data clustering value is based on the updated model. The programming occurs after the aggregated grouped plurality of KV pair data reaches or exceeds the size of the FMU.

In another embodiment, a data storage device includes a memory device and a controller coupled to the memory device. The controller is configured to receive key value (KV) pair data, wherein KV pair data comprises a key and a value, determine characteristics of the received KV pair data, determine a temporary storage location to store the received KV pair data, where the data storage device comprises two or more temporary storage locations, and where the determining is based on the determined characteristics of the received KV pair data, assign the value of the KV pair data to an open flash management unit (FMU), where the open FMU is associated with the temporary storage location, and encode and program the data of the open FMU to a selected location of the memory device after the open FMU is filled to writable capacity.

The two or more temporary storage locations are disposed in random access memory (RAM). The controller is further configured to maintain the two or more temporary storage locations in parallel. The received KV pair data includes a hint, and wherein the controller is configured to utilize the hint to determine the temporary storage location to store the received KV pair data. The two or more temporary storage locations are disposed in single level cell (SLC) memory of the memory device. The controller is further configured to aggregate KV pair data stored in the two or more temporary storage locations after receiving an indication for garbage collection. The aggregating is based on the determined characteristics of the KV pair data stored in the two or more temporary storage locations. Determining the temporary storage location further includes determining a relationship between a first predicted read time of a first KV pair data and a second predicted read time of a second KV pair data. The controller is further configured to, based on the determining the relationship, either assign a first value of the first KV pair data and a second value the second KV pair data to a same codeword or FMU, assign the first value of the first KV pair data and the second value the second KV pair data to a same container, or assign the first value of the first KV pair data to a first die and the second value of the second KV pair data to a second die, wherein the first die and the second die are accessed in parallel.

In another embodiment, a data storage device includes memory means and a controller coupled to the memory means. The controller is configured to aggregate key value (KV) pair data having a length less than a flash management unit (FMU) size in a storage location, where the aggregating is based on a relationship between a first KV pair data and a second KV pair data, and program the aggregated KV pair data to the memory means when the aggregated KV pair data is equal to or greater than the FMU size.

The relationship is determined based on a first expected read time of the first KV pair data and a second expected read time of the second KV pair data.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
receive key value (KV) pair data, wherein a length of the KV pair data is less than a size of a flash management unit (FMU), and wherein the KV pair data comprises a key and a value;
group a plurality of KV pair data based on a data clustering value, wherein each KV pair data of the plurality of KV pair data has a length less than the size of the FMU, wherein the data clustering value is based on at least one of a length of each KV pair data, a key index of each KV pair data, and internal patterns of a value of each KV pair data;
aggregate the grouped plurality of KV pair data; and
program the aggregated plurality of KV pair data to the memory device.

2. The data storage device of claim 1, wherein the data clustering value for a first KV pair data is increased when a first length of the first KV pair data and a second length of a second KV pair data is within a predetermined length threshold.

3. The data storage device of claim 1, wherein the data clustering value for a first KV pair data is increased when a first key index of the first KV pair data and a second key index of a second KV pair data are the same.

4. The data storage device of claim 1, wherein the data clustering value for a first KV pair data is increased when a second metadata of a second KV pair data is within a predetermined threshold difference of a first metadata of the first KV pair data.

5. The data storage device of claim 1, wherein the data clustering value for a first KV pair data is increased when at least a portion of an internal pattern of the first KV pair data and at least a portion of an internal pattern of a second KV pair data are the same.

6. The data storage device of claim 1, wherein the controller is further configured to:
receive a first read command for a first KV pair data;
determine first characteristics of the first KV pair data;
generate a model based on the determined first characteristics of the first KV pair data;
receive a second read command for a second KV pair data;
determine second characteristics of the second KV pair data; and
update the model based on the determined second characteristics.

7. The data storage device of claim 6, wherein the data clustering value is based on the updated model.

8. The data storage device of claim 1, wherein the programming occurs after the aggregated grouped plurality of KV pair data reaches or exceeds the size of the FMU.

9. A data storage device, comprising:
a memory device; and
a controller coupled to the memory device, wherein the controller is configured to:
receive key value (KV) pair data, wherein a length of the KV pair data is less than a size of a flash management unit (FMU), and wherein the KV pair data comprises a key and a value;
group a plurality of KV pair data based on a data clustering value, wherein each KV pair data of the plurality of KV pair data has a length less than the size of the FMU, wherein the data clustering value is based on at least one of a length of each KV pair data, a key index of each KV pair data, a time difference of each KV pair data, metadata of each KV pair data, and internal patterns of a value of each KV pair data;
aggregate the grouped plurality of KV pair data; and
program the aggregated plurality of KV pair data to the memory device, wherein the data clustering value for a first KV pair data is increased when a time difference between the first KV pair data and a second KV pair data is less than or equal to a predetermined time threshold, and wherein the data clustering value for the first KV pair data is decreased when the time difference between the first KV pair data and the second KV pair data is greater than the predetermined time threshold.

10. A data storage device, comprising:
a memory device; and
a controller coupled to the memory device, wherein the controller is configured to:
receive key value (KV) pair data, wherein KV pair data comprises a key and a value;
determine characteristics of the received KV pair data;
determine a temporary storage location to store the received KV pair data, wherein the data storage device comprises two or more temporary storage locations, and wherein the determining is based on the determined characteristics of the received KV pair data;
assign the value of the KV pair data to an open flash management unit (FMU), wherein the open FMU is associated with the temporary storage location; and
encode and program the data of the open FMU to a selected location of the memory device after the open FMU is filled to writable capacity, wherein the received KV pair data includes a hint, and wherein the controller is configured to utilize the hint to determine the temporary storage location to store the received KV pair data.

11. The data storage device of claim 10, wherein the two or more temporary storage locations are disposed in random access memory (RAM).

12. The data storage device of claim 10, wherein the controller is further configured to maintain the two or more temporary storage locations in parallel.

13. The data storage device of claim 10, wherein the two or more temporary storage locations are disposed in single level cell (SLC) memory of the memory device.

14. The data storage device of claim 13, wherein the controller is further configured to aggregate KV pair data stored in the two or more temporary storage locations after receiving an indication for garbage collection, and wherein the aggregating is based on the determined characteristics of the KV pair data stored in the two or more temporary storage locations.

15. The data storage device of claim 10, wherein determining the temporary storage location further comprises determining a relationship between a first predicted read time of a first KV pair data and a second predicted read time of a second KV pair data.

16. The data storage device of claim 15, wherein the controller is further configured to, based on the determining the relationship, either:
assign a first value of the first KV pair data and a second value the second KV pair data to a same codeword or FMU;
assign the first value of the first KV pair data and the second value the second KV pair data to a same container; or
assign the first value of the first KV pair data to a first die and the second value of the second KV pair data to a second die, wherein the first die and the second die are accessed in parallel.

17. A data storage device, comprising:
memory means; and
a controller coupled to the memory means, wherein the controller is configured to:
aggregate key value (KV) pair data having a length less than a flash management unit (FMU) size in a storage location, wherein the aggregating is based on a relationship between a first KV pair data and a second KV pair data; and
program the aggregated KV pair data to the memory means when the aggregated KV pair data is equal to or greater than the FMU size, wherein the KV pair data includes a hint, and wherein the controller is configured to utilize the hint to determine a temporary storage location to store the KV pair data prior to programming to the memory means.

18. The data storage device of claim 17, wherein the relationship is determined based on a first expected read time of the first KV pair data and a second expected read time of the second KV pair data.

* * * * *